May 6, 1958 R. E. LAISY 2,833,325
COUNTERSUNK FLEXIBLE HEAD THREADED FASTENER
Filed Feb. 9, 1954 3 Sheets-Sheet 1
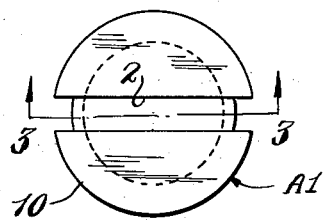
FIG. 2
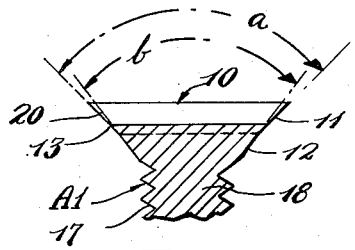
FIG. 3
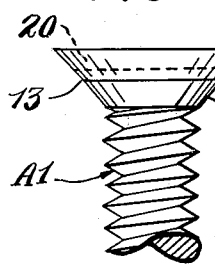
FIG. 1
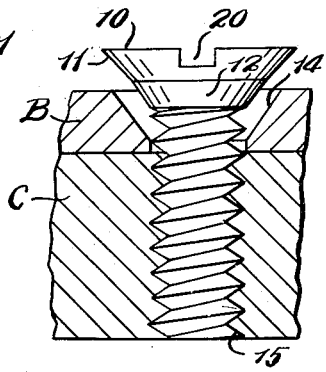
FIG. 4
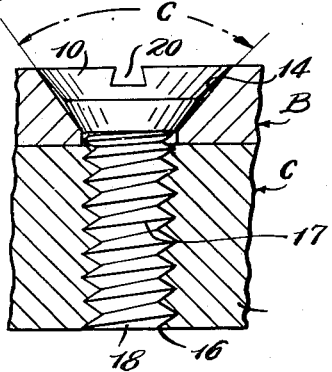
FIG. 5
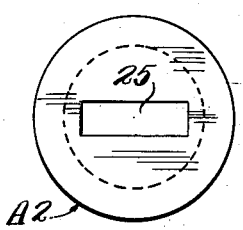
FIG. 6
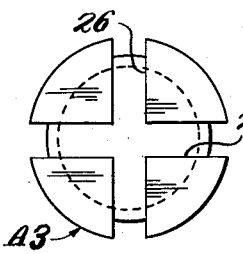
FIG. 8
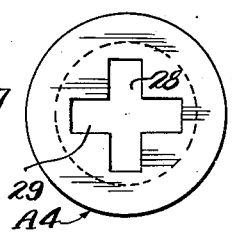
FIG. 10
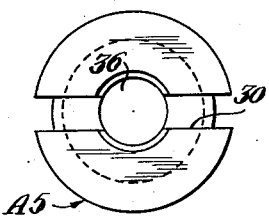
FIG. 12
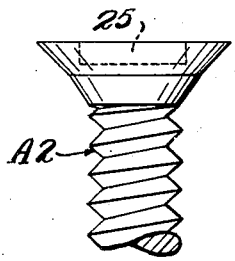
FIG. 7
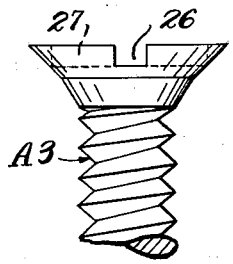
FIG. 9
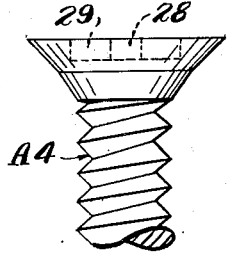
FIG. 11
FIG. 13
INVENTOR.
RUDYARD E. LAISY
BY Hudson, Boughton,
Williams, David & Hoffmann
ATTORNEYS May 6, 1958 R. E. LAISY 2,833,325
COUNTERSUNK FLEXIBLE HEAD THREADED FASTENER
Filed Feb. 9, 1954 3 Sheets-Sheet 2
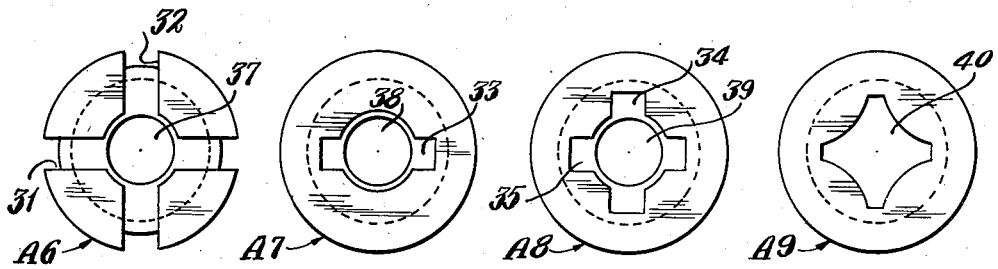
Fig. 14   Fig. 16   Fig. 18   Fig. 20
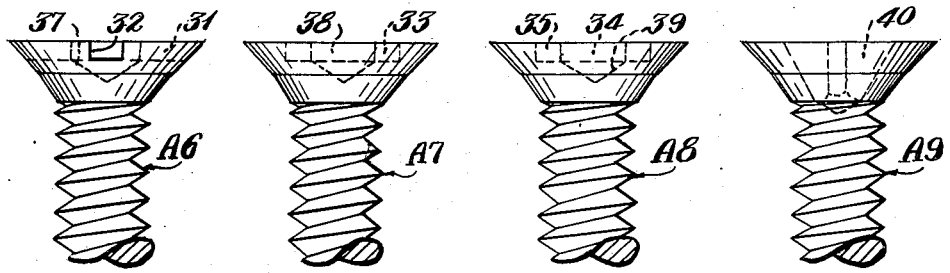
Fig. 15   Fig. 17   Fig. 19   Fig. 21
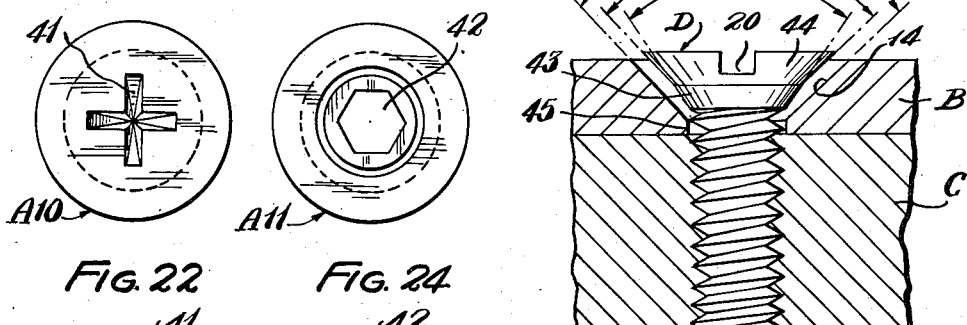
Fig. 22   Fig. 24
Fig. 26
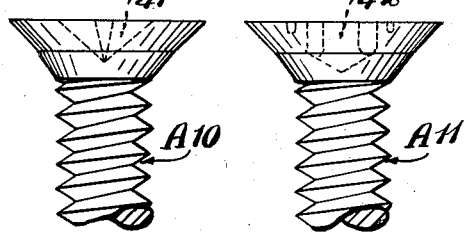
Fig. 23   Fig. 25
INVENTOR.
RUDYARD E. LAISY
BY Hudson, Boughton,
Williams, David & Hoffmann
ATTORNEYS May 6, 1958

R. E. LAISY 2,833,325

COUNTERSUNK FLEXIBLE HEAD THREADED FASTENER

Filed Feb. 9, 1954

INVENTOR.
RUDYARD E. LAISY
BY Hudson, Boughton,
Williams, David & Hoffmann
ATTORNEYS United States Patent Office 2,833,325
Patented May 6, 1958

2,833,325

COUNTERSUNK FLEXIBLE HEAD THREADED FASTENER

Rudyard E. Laisy, Rocky River, Ohio, assignor to The National Screw & Manufacturing Company, Cleveland, Ohio, a corporation of Ohio Application February 9, 1954, Serial No. 409,050

2 Claims. (Cl. 151—14)

The present invention relates to the art of fastening and to a fastener having a self-contained locking feature which utilizes inclined surfaces.

The principal object of the invention is to provide a novel and improved fastener for and/or method of joining articles together which utilizes an inclined surface that yieldably engages a seat inclined at a slightly smaller angle with reference to the longitudinal axis of the fastener, thereby providing a springing action between the parts which as a radial as well as a vertical component.

A more specific object is to provide a novel and improved fastener of the character referred to having a head and/or nut provided with an inclined surface on its inner side and having the end or side opposite the inclined surface made relatively yieldable by a recess or recesses therein.

A still more specific object is to provide a novel and improved fastener of the character referred to in which the flexing of the head and/or nut can be controlled to a predetermined amount preferably such that the head and/or nut will not be stressed beyond the elastic limit.

Another object of the invention is the provision of a novel and improved fastener of the character referred to having the same or superior strength characteristics as ordinary countersunk threaded fasteners of the same size and material and which will be simple in construction, inexpensive to manufacture, will be a self-contained, integral unit and may employ conventional driving means, thus permitting its application by conventional tools.

Another object of the invention is the provision of a novel and improved joint or connection and method of joining or connetcing members together which employs a countersunk threaded fastener and socket combination so constructed and arranged that the fastener and, particularly the outer portion thereof, will be flexed when the fastener is used in the normal and expected manner, which flexing will apply a locking action to the fastener; exerting a supplemental pull on the threads thereof against the threads of the socket to increase its resistance to loosening and especially accidental loosening as from vibration, etc.

The invention resides in certain constructions and combinations and arrangements of parts and further objects and advantages will be apparent to those skilled in the art to which the invention relates from the following description of the preferred embodiments described with reference to the accompanying drawings forming a part of this specification in which similar reference characters designate corresponding parts, and in which Fig. 1 is a side elevational view of a countersunk head machine screw embodying the present invention;

Fig. 2 is a top plan view of the screw shown in Fig. 1;

Fig. 3 is an enlarged, fragmentary, sectional view of the screw shown in Fig. 1 taken approximately on the line 3—3 of Fig. 2;

Fig. 4 is a fragmentary, section view of the screw shown in the preceding figures, in the process of being applied to hold two parts together;

Fig. 5 is a fragmentary, sectional view similar to Fig. 4 but showing the screw in final tightened position;

Figure 27:
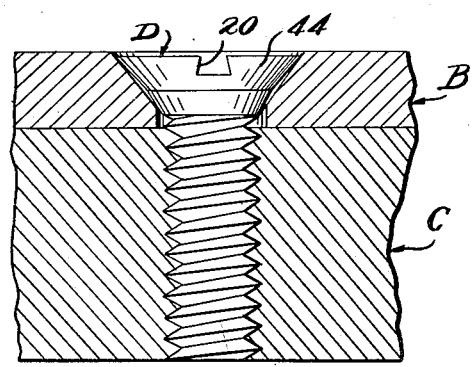
Figure 30:
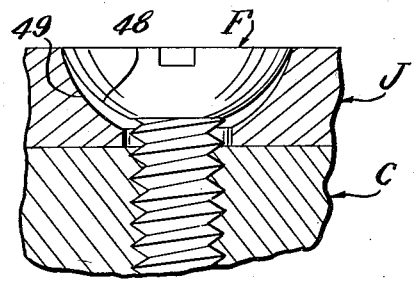
Figure 31:
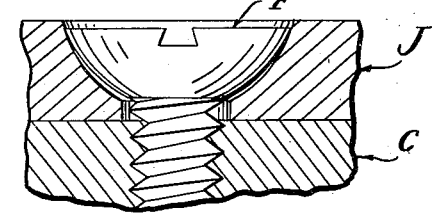
Figure 28:
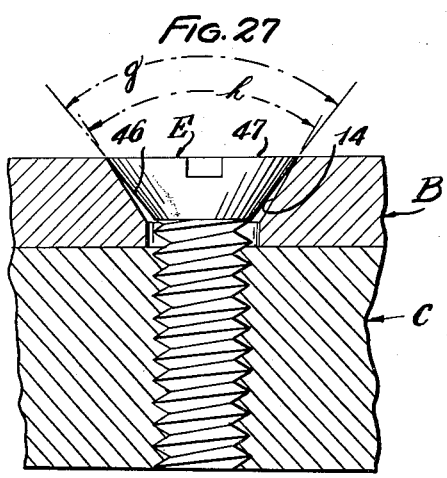
Figure 32:
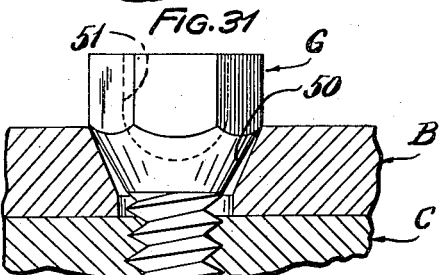
Figure 29:
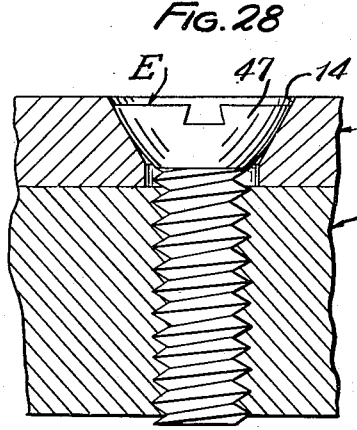
Figure 33:
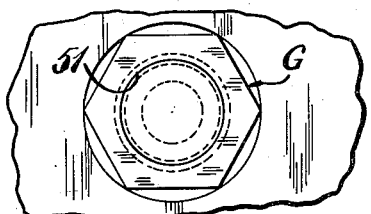
Figures 34, 35:
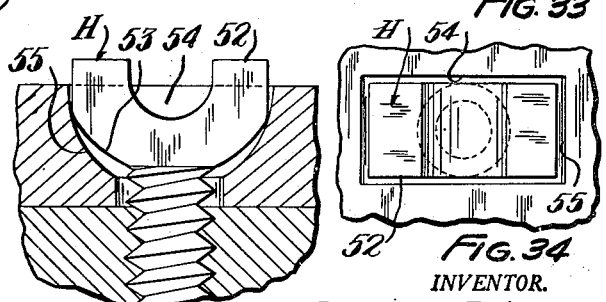

Figs. 6 and 7, 8 and 9, 10 and 11, 12 and 13, 14 and 15, 16 and 17, 18 and 19, 20 and 21, 22 and 23 and 24 and 25 are plan and fragmentary, side elevational views, respectively, of modified constructions;

Figs. 26 and 27 are views somewhat similar to Figs. 4 and 5 but showing a further embodiment of this invention;

Figs. 28 and 29 are views similar to Figs. 4 and 5 but showing a still further embodiment of this invention;

Figs. 30 and 31 are views similar to Figs. 4 and 5 but showing a still further embodiment of this invention;

Fig. 32 is a view somewhat similar to Fig. 28, but showing a further embodiment of this invention;

Fig. 33 is a fragmentary plan view of the device shown in Fig. 32;

Figs. 34 and 35 are plan and fragmentary side elevational views, respectively of a bolt head utilizing the prinicples of this invention and showing a portion of the receiving socket.

Broadly, the invention contemplates the obtaining of a lock feature or effect in a fastening structure by the provision of a pair of differently inclined or tapered cooperating surfaces, one on the fastener and the other on the member engaged by the fastener, the tapered or inclined surface on the fastener being greater than that employed in conventional countersunk head fasteners and being so adapted and arranged that it yields relative to the other as the portion of the fastener containing the inclined surface is seated into the member engaged by the fastener. The invention further contemplates making the surface on the fastener yieldable by forming a recess or recesses in the metal adjacent to the inclined surface and to, in some instances, adapt the recess or recesses for the dual function of receiving driving means. The invention further incorporates in the fastener means to limit the amount of flexure produced.

Referring to Figs. 1 through 25 of the drawings, a preferred embodiment of the invention is shown therein incorporated in a plurality of countersunk head machine screws designated generally by the reference characters A–1 through A–11.

The underside of the flat countersunk head 10 of the machine screw A–1, shown in Figs. 1 to 5, is formed of an outer tapered, frusto conical-like surface designated 11 and the inner tapered surface 12. The two surfaces are approximately equal in height and the sharp juncture 13 where they meet is broken so as to avoid as much as possible a concentration of stress at this point. The taper 11 of the outer portion of the head 10 has an included angle *a* slightly larger than the included angle *b* of the inner taper 12 which is approximately the same as the included angle *c* of the socket 14. The socket 14 forms the outer end of the fastener receiving aperture 15 in a member or part B, and is adapted to be engaged by the head of the screw A–1 when the screw is tightened to hold the part B to a part C, which may be a nut or the like, having a tapped aperture 16 providing mating threads for the thread 17 on the shank 18 of the screw A–1.

The outer surface of the head 10 of the screw A–1 is provided with a slot 20, the width and depth of which in the present instance is determined by the extent to which it is desired to relieve the head to obtain a predetermined flexing of the head and, in turn, a predetermined load on the shank of the screw A–1. The width and depth of the slot 20 is governed by the strength of the material from which the fastener is made, the proportions of the head, and the amount of flexure which is to be imparted to the head. As shown, the width of the slot 20 is such as to receive a standard screw driver and the depth is such as to obtain the desired flexibility.

In operation, when the screw A-1 is tightened to seat the head 10 in the socket 14, the outer edge of the head engages the socket first (see Fig. 4), causing the outer portion of the head 11 to flex inwardly before the inner portion or taper 12 comes in contact with the socket. By controlling the angles of the inner and outer tapers, the amount of flexure in the head can be controlled. The engagement of the inner taper 12 on the rigid part of the head with the socket 14 also limits or determines the extent to which the fastener can be threaded or screwed into the aperture 16. By appropriately designing angles $a$, $b$ and $c$ and by further controlling the depth and width of the slot 20, the outer portion of the head can be stressed to any predetermined amount, which amount is preferably less than the elastic limit. The two inclined or tapered surfaces function differently and independently of one another but cooperate to provide the desired result. The outer inclined or tapered surface flexes and provides the locking action of the fastener and the inner non-flexing inclined or tapered surface provides the control for the amount of flexing and in turn locking imparted to the fastener when seated in the engaging member or socket. In certain instances, it may be desirable to have stress exceed the elastic limit, thereby imparting a permanent deformation to the fastener, as for example, when it is desired that the fastener should not be used over and over again. For most applications, however, it will be desirable to control the above-said angles and dimensions such that the elastic limit will not be exceeded and such that the fastener may be used over and over again. In the drawings, the difference in angularity between the parts of the compound taper and the amount of flexing attained has been exaggerated for purposes of illustration.

Other forms of recesses besides the single slot 20, shown in Figs. 1 to 5, may be employed to relieve and make the screw head flexible; for example, the forms provided in screws A-2 to A-11 illustrated in Figs. 6 through 25, which forms include a single slot 25 terminating short of the circumference of the screw head, see Figs. 6 and 7; cross-slots 26 and 27 extending completely across the head, see Figs. 8 and 9; cross-slots 28 and 29 stopping short of the side of the screw, as shown in Figs. 10 and 11; single and cross-slots 30, 31, 32 extending through the circumference of the screw head and having central recesses 36 and 37, as shown in Figs. 12 and 13, 14 and 15; single and cross-slots stopping short of the circumference of the screw head 33, 34 and 35 and having central recesses 38 and 39, as shown in Figs. 16 and 17, 18 and 19; and Phillips, Frearson and hexagonal recesses 40, 41 and 42, respectively, as shown in Figs. 20 and 21, 22 and 23, 24 and 25. The Phillips-Frearson and hexagonal recesses, however, are not necessarily made to so-called standard depths as the depth size of the recesses depends upon the degree of flexibility and resulting loading which it is desired to obtain.

The central recesses such as those shown in some of the views referred to have the added feature of providing a more uniform flexing of the screw head. Aside from the recesses shown, screws A-2 to A-11 are similar to screw A-1.

The machine screw D show in Figs. 26 and 27 is similar to the machine screw shown in Figs. 1 to 5 except that the included angle $d$ of the inner frusto conical surface 43 on the underside of the head is less than the included angle $e$ of the socket 14 whereas the corresponding included angle $b$ of screw A-1 is substantially the same on the included angle $c$ of the socket and the head 44 is otherwise so constructed that the angle $f$ included between diametrically opposite lines drawn through the inner and outer extremities of the head is substantially the same as that of the socket 14. As the screw D is tightened into its socket, the bottom taper 43 engages and bears against the edge of the aperture 45 in the workpiece B. The extent to which the head of the screw can be drawn into the socket in the workpiece and, in turn, the amount the head is flexed is controlled not only by the angles of the tapers but also by the size or diameter of the aperture 45. This embodiment like the previous embodiments referred to has the advantage of controlling the flexure at the top portion of the head to a predetermined amount but in some applications may have other advantages because of the difference in construction and the manner in which the amount of flexing can be controlled at the time of application by merely varying the size of the aperture 45 with which it is used.

The screw E shown in Figs. 28 and 29 is similar to screws A-1 except that it has a single taper as distinguished from a compound or double taper on the underside 46 of its head 47, the included angle $g$ of which taper is greater than the included angle $h$ of the socket. As the machine screw E is tightened into position, the outer end of the head 47 will contact the upper end of the socket 14 and yield until the shape of the surface 46 substantially corresponds to the shape of the socket 14, as shown in Fig. 29.

The machine screw F shown in Figs. 30 and 31 differs from the previous modifications in that the inclined surface 48 on the bottom portion of its head is a curved surface of revolution; for example, a portion of a sphere. The inclined surface 49 of the socket is likewise a curved surface of revolution such as spherical, conical, etc. Other curved surfaces of revolution, viz. portions of ellipsoids, paraboloids, hyperboloids, etc. could be used for the inclined surfaces on the screw and/or socket provided that corresponding portions on the screw have a greater radius of curvature than their corresponding portions of the socket.

The invention is not limited to countersunk fasteners intended to have their heads flush with the work when applied thereto nor to fasteners having their heads relieved by means of screw driver slots and the like but is equally applicable to fasteners having a portion of its head extending above the surface of the workpiece and to fasteners adapted to be driven by wrenches and the like.

Machine screw G shown in Figs. 32 and 33 is one such fastener and is similar to machine screw E shown in Figs. 28 and 29 in that a conical taper 50 is used for the surface on the underside of the head of the screw but differs from preceding embodiments in that the sides of its head have been made hexagonal to receive a box wrench or the like. The head of the screw is made flexible by means of a parabolic recess 51 in the top portion of its head.

The invention may also be embodied in fasteners which are adapted to be non-rotatably held by its socket in the workpiece such as bolt H in Figs. 34 and 35 which has a non-conventional head 52 in the form of a rectangle. The bottom inclined surface 53 of the head is made cylindrical and is shown seated in a rectangular socket 54 whose bottom surface 55 is likewise cylindrical but having a smaller radius of curvature than that of the surface 53 on the bolt.

In practice it has been found desirable to make the taper of the single tapered fastener and/or the outer taper of a compound tapered fastener of from about 3 to 10 degrees greater than the taper of its socket depending upon the results desired, the material from which the fastener is made, etc. as will be well understood by those skilled in the art to which this invention relates. For normal conditions and included angles approximately those used in conventional practice, the difference is preferably about 5° for screws made of type 1022 steel.

Conventional practices and tools utilize and provide a socket having an included angle of about 80° to 82° and for practical purposes fasteners embodying the present invention are preferably made to utilize these angles as far as possible. It has also been found that in most cases satisfactory yieldability can be imparted to the fasteners by removing from about 20 to 35 percent of the metal in the head or the like depending upon the material of the fasteners and the type of recess employed.

By way of illustrating the advantages of the present invention, machine screws similar to the screw E shown in Fig. 28 of the drawings having a taper of 86° included angle, a slot depth of 38% of total head height, a recess volume constituting approximately 26.3% of the total head volume and made of heat treated type 1022 steel when used with standard 80° included angle socket, have a break-away unlocking torque of about 35 to 40% greater than that of similar standard countersunk machine screws. Similar screws having cross type slots like the screw shown in Figs. 8 and 9, a taper of 86° included angle, a slot depth of 38% of total head height, and a recess volume constituting approximately 33.5% of the total head volume, have a break-away unlocking torque of about 40 to 45% greater than that for a similar standard countersunk machine screw. Like screws but having Phillips type recesses, a taper of 86° included angle, a recess depth of 120% of total head height, and a recess volume constituting approximately 23% of the total head volume, have a break-away unlocking torque of about 30% to 40% greater than that for a similar standard Phillips countersunk machine screw.

From the foregoing description of the preferred embodiments of this invention, it will be apparent that the objects heretofore enumerated and others have been accomplished, and that there has been provided a fastener which is more flexible than has hereto been provided and which incorporates an improved locking action which can be controlled as desired.

It will also be apparent that the fastener does not mar the seat of its mating socket and therefore can be repeatedly assembled and disassembled, and that its usage does not require elaborate or special preparation of the parts assembled beyond the normal precautions ordinarily used with the application of standard countersunk head machine screws. It will further be apparent that special driving means need not be developed and/or used to utilize this invention, but that the fasteners can be adapted for use with conventional driving tools such as standard screw drivers, box wrenches and the like.

While a number of preferred embodiments of the invention have been shown and described in considerable detail, the invention is not limited to the forms or constructions shown and it is the intention to cover hereby all the adaptations and modifications and uses thereof which come within the practice of those skilled in the art to which the invention relates and the scope of the appended claims.

Having thus described my invention, I claim:

1. A countersunk head threaded fastener comprising a head portion and a shank portion depending from one side of the head portion, the side of said head portion having an inner and an outer conical surface with the inner conical surface adjacent said shank portion and extending about 50% of the height of the head portion, the outer conical surface of said head portion having an included angle which is greater than about 82°, the included angle of the inner conical surface of said head portion being about 3° to 10° less than that of the outer conical surface and said head portion having a recess in the side thereof opposite to said shank portion of approximately 50% of the height of said head for imparting flexibility to said head portion, said recess comprising about 20% to 35% of said head portion.

2. In combination a member having an aperture the outer end of which is in the form of a conical socket having an included angle of about 80° to 82°, a threaded fastener in said aperture formed with a shank and a head portion, said head portion having an inner and an outer conical surface each of which extends about 50% of the height of the head portion with the inner conical surface being adjacent said shank portion, the inner conical surface of said head portion having an included angle not greater than that of said conical socket and the outer conical surface having an included angle slightly larger than that of said conical socket and said head portion having a recess of approximately 50% of the height of said head to enable the entire circumferential surface of said outer conical surface to yieldably engage said socket.

References Cited in the file of this patent

UNITED STATES PATENTS

| | | |
|---|---|---|
| 534,850 | Bezer | Feb. 26, 1895 |
| 1,637,764 | Coles | Aug. 2, 1927 |
| 2,218,856 | Roessner | Oct. 22, 1940 |
| 2,301,590 | Signorelli | Nov. 10, 1942 |
| 2,527,616 | Beckstrom | Oct. 31, 1950 |
| 2,543,705 | Place | Feb. 27, 1951 |
| 2,640,521 | Zavoico | June 2, 1953 |

OTHER REFERENCES

Fasteners, volume 5, number 3, published by American Institute of Bolt, Nut and Rivet Manufacturers, 1550 Hanna Bldg., Cleveland 15, Ohio. (Page 16 relied on.)